(12) United States Patent
Mabuchi et al.

(10) Patent No.: US 8,074,762 B2
(45) Date of Patent: Dec. 13, 2011

(54) VEHICLE BODY MOUNTING CONFIGURATION INCLUDING EXHAUST SYSTEM HEAT EXCHANGER

(75) Inventors: Tomoki Mabuchi, Toyota (JP); Hisashi Nishino, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 936 days.

(21) Appl. No.: 12/007,677

(22) Filed: Jan. 14, 2008

(65) Prior Publication Data

US 2008/0185133 A1    Aug. 7, 2008

(30) Foreign Application Priority Data

Feb. 5, 2007    (JP) ................................. 2007-025950

(51) Int. Cl.
    *B60K 13/04*    (2006.01)
(52) U.S. Cl. ...................................................... 180/309
(58) Field of Classification Search .................. 180/296, 180/309; 296/204, 208
    See application file for complete search history.

(56) References Cited

U.S. PATENT DOCUMENTS

| | | | |
|---|---|---|---|
| 4,909,530 A | | 3/1990 | Tsukada et al. |
| 5,195,607 A | * | 3/1993 | Shimada et al. ............. 180/296 |
| 5,323,989 A | * | 6/1994 | Hamada et al. .................. 248/60 |
| 5,560,651 A | * | 10/1996 | Kami et al. ..................... 280/788 |
| 5,813,491 A | | 9/1998 | Sato et al. |
| 2002/0185893 A1 | | 12/2002 | Hashirayama et al. |

FOREIGN PATENT DOCUMENTS

| | | |
|---|---|---|
| DE | 199 53 995 A1 | 5/2001 |
| EP | 0 807 749 A2 | 11/1997 |
| EP | 1 298 403 A2 | 4/2003 |
| JP | A-03-045416 | 2/1991 |
| JP | U-03-103880 | 10/1991 |
| JP | A-04-215523 | 8/1992 |
| JP | A-08-025981 | 1/1996 |
| JP | A-2005-155440 | 6/2005 |
| JP | A-2005-329758 | 12/2005 |
| JP | A-2006-105464 | 4/2006 |

\* cited by examiner

*Primary Examiner* — Frank Vanaman
(74) *Attorney, Agent, or Firm* — Oliff & Berridge, PLC (57) ABSTRACT

A vehicle body mounting configuration is obtained which can properly mount an exhaust system heat exchanger on a vehicle body. The configuration includes an exhaust system heat exchanger which extends in a vehicle front-rear direction, a floor tunnel which opens downwards in a vehicle vertical direction, a body cross member which bridges wall portions of the floor tunnel, and a support portion which supports in a suspending fashion the exhaust system heat exchanger relative to the body cross member. The body cross member overlaps at an upper side in the vehicle vertical direction relative to a partition wall pipe which lies outside of a range where a cooling medium flow path is placed in a longitudinal direction, and the support portion is fixed, respectively, to the exhaust gas exhaust portion of the partition wall pipe and the body cross member.

6 Claims, 9 Drawing Sheets

VEHICLE BODY MOUNTING CONFIGURATION INCLUDING EXHAUST SYSTEM HEAT EXCHANGER

CROSS-REFERENCE TO RELATED APPLICATION

This application claims priority under 35 USC 119 from Japanese Patent Application, No. 2007-25950, the disclosure of which is incorporated by reference herein.

BACKGROUND OF THE INVENTION

1. Field of the Invention

The present invention relates to a vehicle body mounting configuration including an exhaust system heat exchanger for mounting an exhaust system heat exchanger for allowing heat exchange to take place between exhaust gas and a cooling medium of, for example, a motor vehicle on a vehicle body.

2. Description of Related Art

As is shown in, for example, Japanese Patent Application Laid-Open (JP-A) No. 2006-105464, a structure is known in which an exhaust system heat exchanger for allowing heat exchange to take place between exhaust gas and engine cooling water is provided between a catalytic converter and a muffler in an exhaust system for discharging exhaust gas of an engine.

In the related art described above, however, nothing was taken into consideration on a vehicle body mounting configuration including the exhaust system heat exchanger.

SUMMARY OF THE INVENTION

The present invention has been made in view of the above circumstances and provides a vehicle body mounting configuration including an exhaust system heat exchanger.

A first aspect of the present invention provides a vehicle body mounting configuration including an exhaust system heat exchanger, comprising: an exhaust system heat exchanger which is extended in a vehicle front-rear direction so as to allow heat exchange to take place between exhaust gas flowing through an exhaust gas flow path and a cooling medium flowing through a cooling medium flow path; a tunnel portion which opens downwards in a vehicle vertical direction and extends in a vehicle front-rear direction and in which at least part of the exhaust system heat exchanger is placed inside; a cross member which extends in a vehicle width direction and which bridges wall portions of the tunnel portion which face each other in a vehicle width direction at an upper side in a vehicle vertical direction relative to a portion of the exhaust system heat exchanger which lies outside, in a longitudinal direction, of a range where the cooling medium flow path is placed; and a suspending support unit which is fixed at one end to a portion of the exhaust system heat exchanger at a lower side in a vehicle vertical direction of the cross member, and is fixed at the other end to the cross member so as to support the exhaust system heat exchanger on the cross member in a suspending fashion.

A second aspect of the present invention provides a vehicle body mounting configuration including an exhaust system heat exchanger, comprising: an exhaust system heat exchanger which is extended in a vehicle front-rear direction so as to allow heat exchange to take place between exhaust gas flowing through an exhaust gas flow path and a cooling medium flowing through a cooling medium flow path; a tunnel portion which opens downwards in a vehicle vertical direction and extends in a vehicle front-rear direction and in which at least part of the exhaust system heat exchanger is placed inside; and a cross member which extends in a vehicle width direction and which bridges wall portions of the tunnel portion which face each other in a vehicle width direction and forms a closed cross-sectional structure at an upper side in a vehicle vertical direction relative to a portion of the exhaust system heat exchanger which lies outside, in a longitudinal direction, of a range where the cooling medium flow path is placed.

A third aspect of the present invention provides a vehicle body mounting configuration including an exhaust system heat exchanger, comprising: an exhaust system heat exchanger which is extended in a vehicle front-rear direction and is disposed in such a manner that a lowermost portion in a vehicle vertical direction is positioned at one end in a longitudinal direction; and a fuel tank which is disposed closer to the one end than a central position in a longitudinal direction of the exhaust system heat exchanger so that a lowermost portion in a vehicle vertical direction projects further downwards in a vehicle vertical direction than the one end of the exhaust system heat exchanger.

BRIEF DESCRIPTION OF THE DRAWINGS

Embodiments of the present invention will be described in detail based on the following figures, wherein.

DETAILED DESCRIPTION OF THE INVENTION

Herebelow, an example of an exemplary embodiment of the present invention will be described in detail with reference to the drawings.

A vehicle exhaust system mounting configuration 10 to which a vehicle body mounting configuration including an exhaust system heat exchanger according to an embodiment of the present invention is applied will be described based on FIGS. 1 to 9. Herebelow, a schematic overall configuration of an exhaust system (an exhaust gas system) 11 of the vehicle exhaust system mounting configuration 10, a configuration of an exhaust system heat exchanger 15, a schematic overall configuration of a vehicle body B on which the vehicle exhaust system mounting configuration 10 is mounted and a mounting configuration (a mounting posture) of the exhaust system 11 which includes the exhaust system heat exchanger 15 relative to the vehicle body B will be described sequentially in that order. Note that in the following description, when such words as upstream and downstream are simply used, they are to denote upstream and downstream of an exhaust gas flow direction. In addition, an arrow FR, arrow UP and arrow W which are shown in the respective drawings are to denote, respectively, front side (running direction) in a vehicle front-rear direction, upper side in a vehicle vertical direction, and a vehicle width direction, of a motor vehicle to which the vehicle exhaust system mounting configuration 10 is applied.

(Schematic Overall Configuration of Exhaust System)

Figure 6:
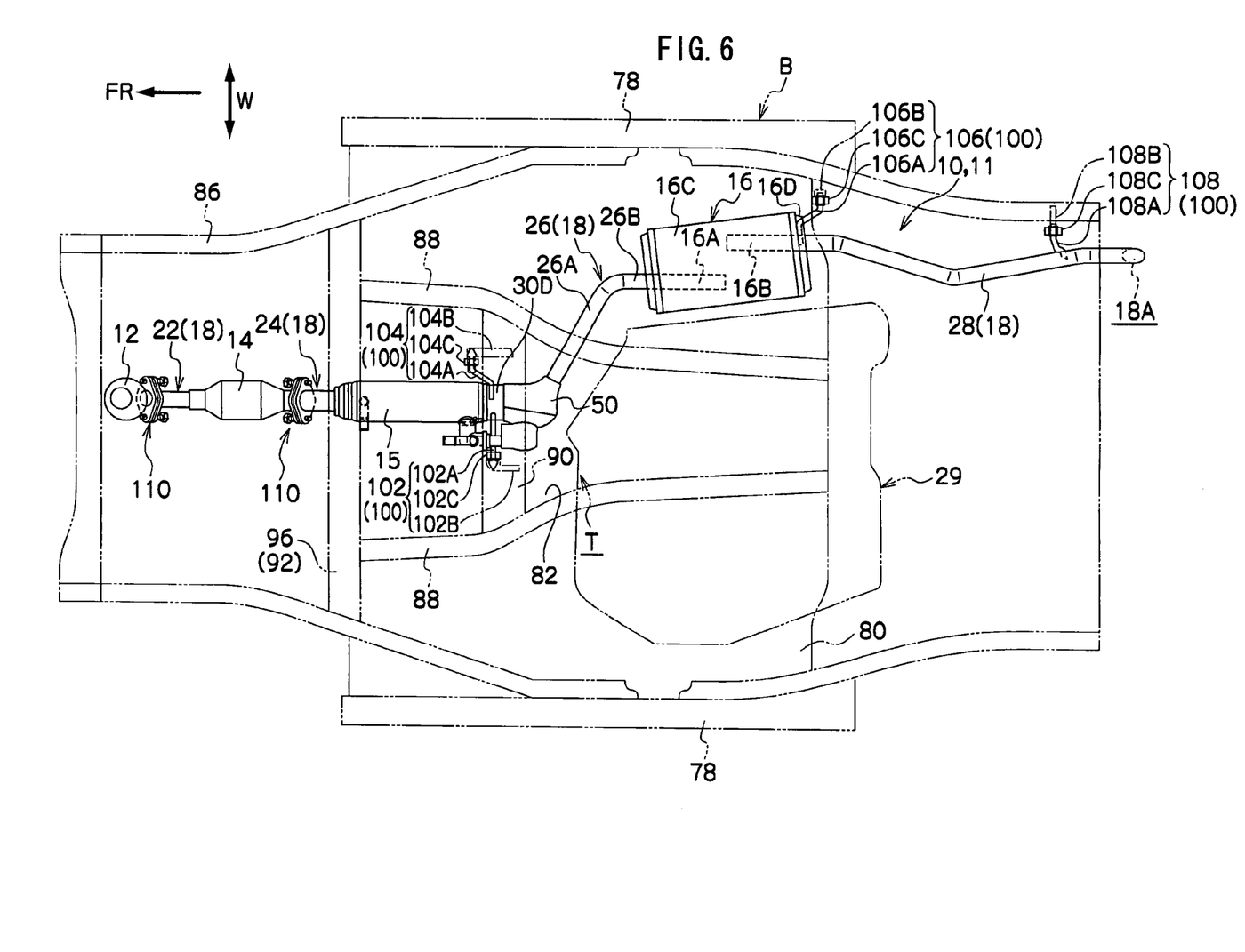
FIG. 6 is a plan view of an exhaust system to which the exhaust system mounting configuration according to the embodiment of the present invention is applied.
Figure 7:
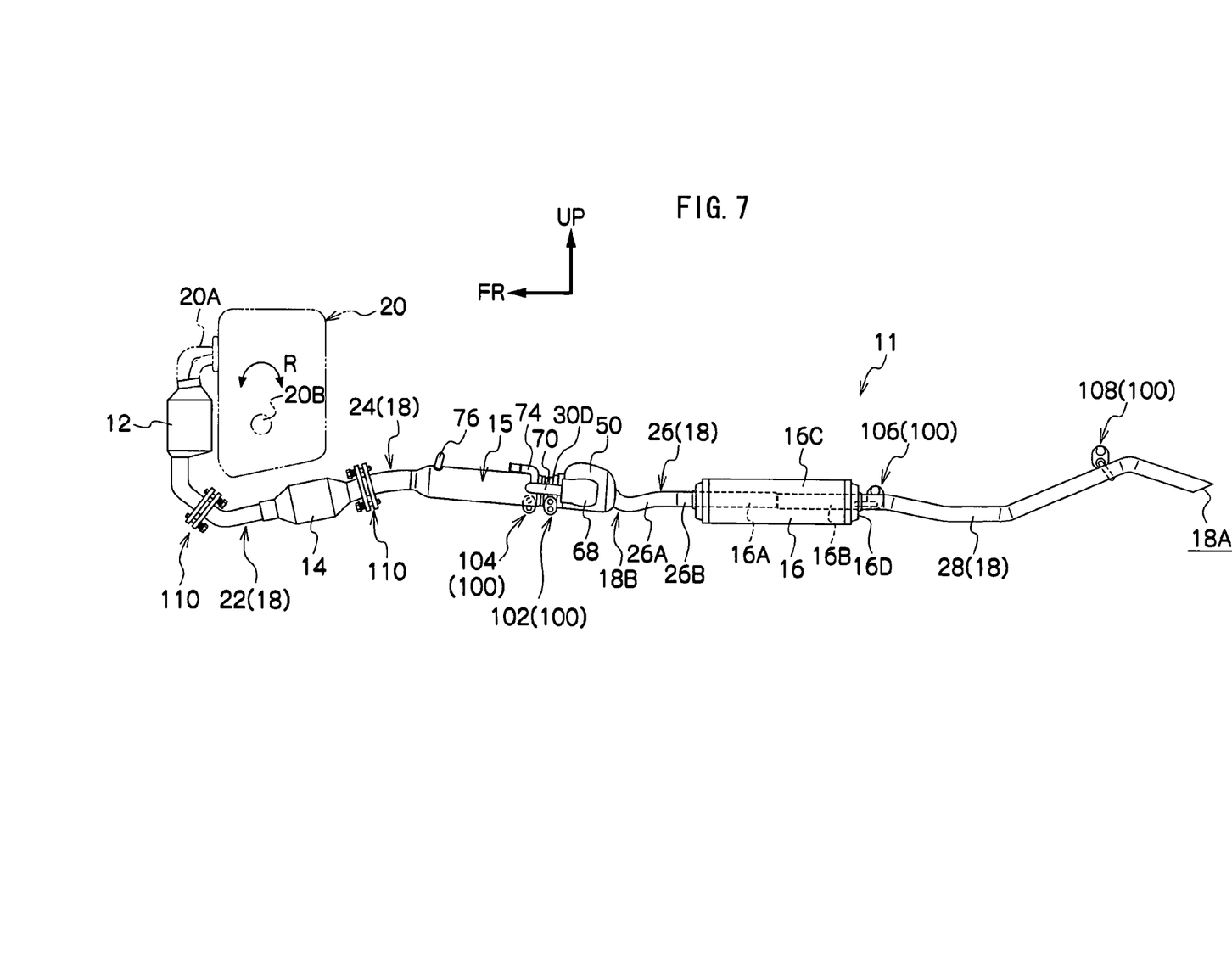
FIG. 7 is a side view of the exhaust system to which the exhaust system mounting configuration according to the embodiment of the present invention is applied.

A schematic overall configuration of an exhaust system 11 which is mounted (supported) on a vehicle body B by a vehicle exhaust system mounting configuration 10 is shown in plan view in FIG. 6, and the exhaust system 11 is shown in side view in FIG. 7. As is shown in these figures, in the vehicle exhaust system mounting configuration 10, the exhaust system 11 forms an exhaust gas flow path, and a catalytic converters 12, 14 for purifying exhaust gases, an exhaust system heat exchanger 15 for recovering heat entrained by exhaust gases, in order to promote engine warm-up and maintain heating, and a muffler 16 for reducing (silencing) exhaust noise, are provided sequentially in that order from an upstream side, and these devices are made to communicate in series with each other by an exhaust pipe 18.

More specifically, the first catalytic converter 12 is, as is shown in FIG. 7, directly coupled to an exhaust manifold 20A of an engine 20, which is an internal combustion engine. The engine 20 is of a transverse type in which an axial direction of a crankshaft 20B coincides substantially with the vehicle width direction and is installed in a front part of a vehicle body. In this embodiment, the engine 20, mounted in a front part of the vehicle body B, is applied to a front-wheel drive vehicle (front-engine front-drive vehicle) or a four-wheel drive vehicle based on a front-wheel drive vehicle, and is configured to impart driving force to at least front wheels, not shown. In addition, as is shown in FIGS. 6 and 7, the first catalytic converter 12 and the second catalytic converter 14 are connected to (made to communicate with) each other via an inter-catalytic converter exhaust pipe 22 which makes up a furthest upstream portion of the exhaust pipe 18. The second catalytic converter 14 and the exhaust system heat exchanger 15 are connected to (made to communicate with) each other via a catalytic converter to heat exchanger exhaust pipe 24 as a first exhaust pipe which makes up an upstream portion of the exhaust pipe 18.

Furthermore, the exhaust system heat exchanger 15 and the muffler 16 are connected to each other via a heat exchanger to muffler exhaust pipe 26 as a second exhaust pipe (exhaust pipe) which makes up an intermediate portion of the exhaust pipe 18. The heat exchanger to muffler exhaust pipe 26 is connected to a muffler inlet pipe 16A of the muffler 16. In addition, a muffler outlet pipe 16B of the muffler 16 is connected to an upstream end of a downstream side exhaust pipe 28, which makes up a downstream portion of the exhaust pipe 18. The downstream side exhaust pipe 28, that is, a downstream end of the exhaust pipe 18 which opens at the rear end portion of the vehicle body B is made to constitute an atmosphere release portion 18A from which exhaust gases that have been purified by the catalytic converters 12, 14 are discharged to the atmosphere.

As a result of the configuration of the exhaust system 11 described above, exhaust gases discharged from the exhaust manifold 20A of the engine 20 which is situated in the front part of the vehicle body flows sequentially through the first catalytic converter 12, the inter-catalytic converter exhaust pipe 22, the second catalytic converter 14, the catalytic converter to heat exchanger exhaust pipe 24, the exhaust system heat exchanger 15, the heat exchanger to muffler exhaust pipe 26, the muffler 16 and the downstream side exhaust pipe 28 in that order and is discharged to the atmosphere from the atmosphere release portion 18A which is situated in the rear end portion of the vehicle body.

In addition, as is shown in FIG. 6, in the exhaust system 11, the muffler 16 is disposed to be offset relative to the exhaust system heat exchanger 15 in the vehicle width direction. In this embodiment, the muffler 16 is disposed in parallel with a fuel tank 29 in the vehicle width direction. Because of this, the heat exchanger to muffler exhaust pipe 26 is made to constitute at its central portion (its main part) an inclined portion 26A which extends in a direction intersecting the vehicle front-rear direction (which is inclined relative to the vehicle front-rear direction) when seen in plan view. A rear end side of the heat exchanger to muffler exhaust pipe 26 is made to constitute a straight portion 26B which extends substantially along the vehicle front-rear direction, and the straight portion 26B is, as has been described above, fixed to the muffler inlet pipe 16A of the muffler 16. Consequently, the vehicle exhaust system mounting configuration 10 can be understood as a configuration in which the inclined portion 26A is provided in the heat exchanger to muffler exhaust pipe 26 in order to dispose the exhaust system 11 or the muffler 16 in such a manner as to go round the fuel tank 29.

(Configuration of Exhaust System Heat Exchanger)

Figure 9:
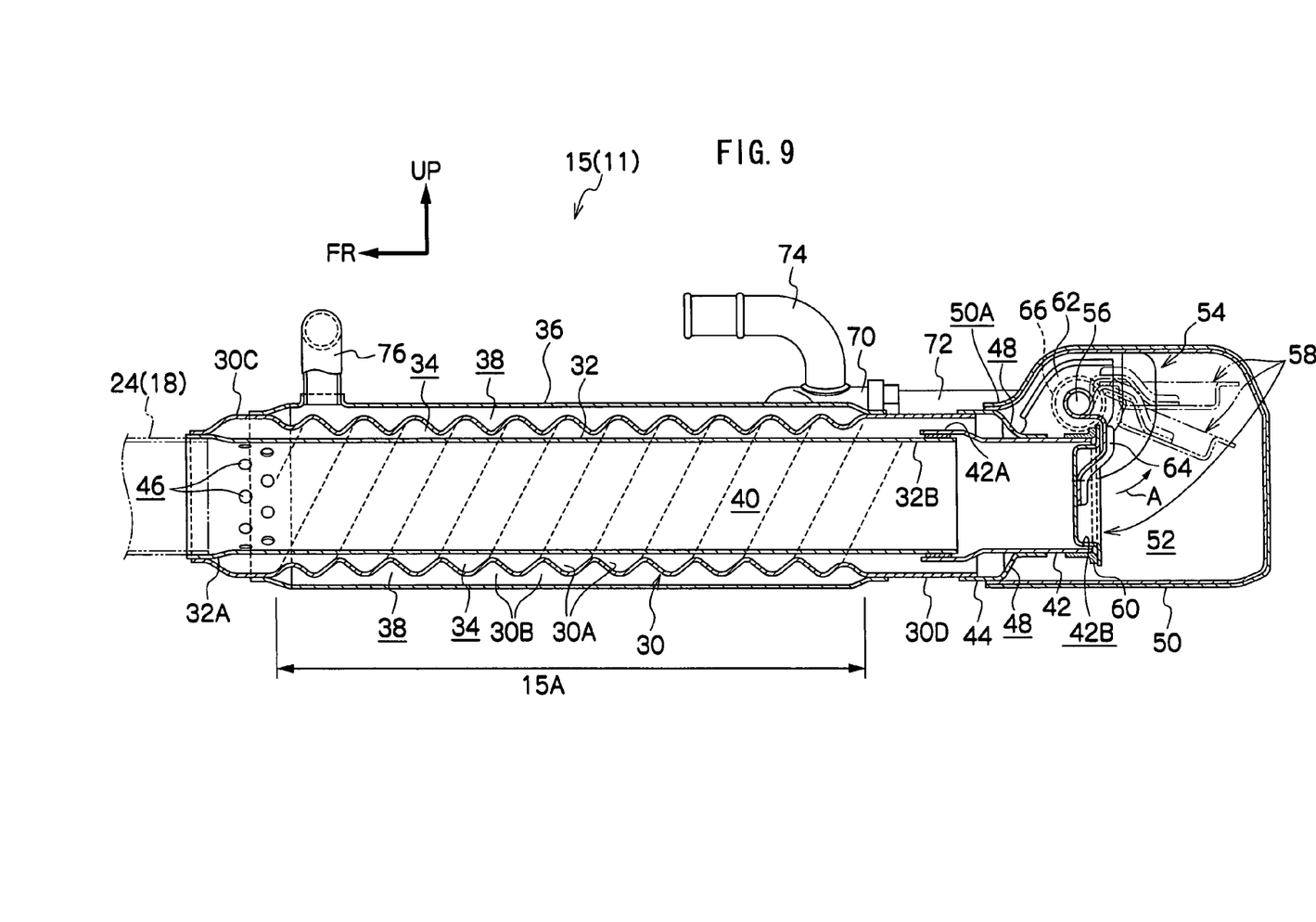
FIG. 9 is a cross-sectional side view which shows the exhaust system heat exchanger which makes up the exhaust system mounting configuration according to the embodiment of the present invention.

The exhaust system heat exchanger 15 is configured to recover heat entrained by exhaust gases to an engine cooling water as a cooling medium and includes, as is shown in FIG. 9, a partition wall pipe 30 which isolates a flow path of the exhaust gases from a flow path of the engine cooling water. In this embodiment, the partition wall pipe 30 has spiral grooves 30A, 30B which are spirally formed on internal and external surfaces of a pipe wall thereof. The spiral grooves 30A, 30B are formed along almost the full length of a heat exchange portion 15A where heat exchange is implemented between the exhaust gases and the engine cooling water, and the front and rear of the partition wall pipe 30 are made to constitute, respectively, an exhaust gas introduction portion 30C and an exhaust gas exhaust portion 30D which extend forwards and rearwards relative to the heat exchange portion 15A.

An inner pipe 32, which functions as a bypass pipe portion formed substantially into a cylindrical shape, is disposed coaxially inside the partition wall pipe 30. A space defined between the partition wall pipe 30 and the inner pipe 32 is made to constitute an exhaust gas flow path 34 of the exhaust system heat exchanger 15. In addition, the partition wall pipe 30 is covered from an outer peripheral side with an outer pipe 36 which is formed substantially into a cylindrical shape and is disposed coaxially. A space defined between the partition wall pipe 30 and the outer pipe 36 is made to constitute an engine cooling water flow path 38 of the exhaust system heat exchanger 15.

In the exhaust system heat exchanger 15, a range where the engine cooling water flow path 38 is formed in the exhaust gas flow direction is made to constitute the heat exchange portion 15A where heat exchange is implemented between exhaust gases and engine cooling water, and the inner pipe 32 protrudes further upstream and downstream than the heat exchange portion 15A. A space within the inner pipe 32 in this exhaust system heat exchanger 15 is made to constitute a bypass flow path 40 as an upstream gas flow path for bypassing the heat exchange portion 15A in the exhaust system heat exchanger 15.

More specifically, as is shown in FIG. 9, a downstream end of the catalytic converter to heat exchanger exhaust pipe 24 is connected to an upstream end 32A of the inner pipe 32, and a downstream end 32B of the inner pipe 32 is connected almost coaxially to an upstream end 42A of an exhaust gas guide pipe 42. Note that in place of the exhaust gas guide pipe 42, the inner pipe 32 may be extended towards the downstream side. In addition, a front end of the exhaust gas introduction portion 30C (the portion further upstream than the heat exchange portion 15A) which projects further upstream than the outer pipe 36 (the engine cooling water flow path 38) in the partition wall pipe 30 is connected to an outer peripheral surface of the upstream end 32A of the inner pipe 32 in an airtight fashion. Furthermore, the exhaust gas exhaust portion 30D (the portion further downstream than the heat exchange portion 15A) of the partition wall pipe 30 which projects further downstream than the outer pipe 36 (the engine cooling water flow path 38) in the partition wall pipe 30 is connected to the exhaust gas guide pipe 42 via an end pipe 44 in an airtight fashion.

In addition, through-holes 46, which establish a communication between the bypass flow path 40 which is the space inside the inner pipe 32 and the exhaust gas flow path 34 of the exhaust system heat exchanger 15, are provided in a portion of the inner pipe 32 which lies inside the exhaust gas introduction portion 30C of the partition wall pipe 30. Namely, the through-holes 46 makes up a diverging portion between the exhaust gas flow path 34 and the bypass flow path 40. On the other hand, through-holes 48, which establish a communication between the inside and outside of the exhaust gas flow path 34, are provided in the end pipe 44. The through-holes 48 and a downstream side opening end 42B of the exhaust gas guide pipe 42 are both made to open to an exhaust gas exit header 52 which is a space within a heat exchanger rear portion shell 50, as a shell, of which an upstream side opening end 50A is airtightly connected to the end pipe 44.

Consequently, in the exhaust system heat exchanger 15, exhaust gases which have bypassed the heat exchange portion 15A and passed through the bypass flow path 40 reaches the exhaust gas exit header 52 within the heat exchanger rear portion shell 50 by way of the inside of the exhaust gas guide pipe 42, while exhaust gases which have passed through the exhaust gas flow path 34 by way of the through-holes 46 reaches the exhaust gas exit header 52 within the heat exchanger rear portion shell 50 by way of the outside of the exhaust gas guide pipe 42 and the through-holes 48.

Furthermore, the exhaust system heat exchanger 15 includes a valve device 54 for opening and closing the downstream side opening end 42B of the exhaust gas guide pipe 42. The valve device 54 includes a valve 58 which can take a closed position (refer to solid lines in FIG. 9) in which the valve 58 rotates around a rotational shaft 56 which is supported by the heat exchanger rear portion shell 50 so as to close the downstream side opening end 42B of the exhaust gas guide pipe 42 and an open position (refer to imaginary lines in FIG. 9) in which the valve 58 rotates in a direction indicated by an arrow A from the closed position to open the downstream side opening end 42B of the exhaust gas guide pipe 42. The valve 58 is configured to be brought into abutment with a valve seat (a seal) 60 provided around the downstream side opening end 42B of the exhaust gas guide pipe 42 when the valve 58 is positioned in the closed position.

The rotational shaft 56, which is extended in the vehicle width direction, is supported on a frame 62 fixed to the exhaust gas guide pipe 42 in such a manner as to rotate relative to the heat exchanger rear portion shell 50. The valve 58 is connected to the rotational shaft 56 via an arm 64 in such a manner as to rotate together with the rotational shaft 56, whereby the valve 58 is allowed to rotate around the rotational shaft 56 to thereby take the aforesaid closed position and open position. In addition, a return spring 66, which functions as a biasing member for generating biasing force to displace the valve 58 to the closed position, is provided on an end portion of the rotational shaft 56 which projects outwards of the heat exchanger rear portion shell 50. As is shown in FIG. 8, the end portion of the rotational shaft 56 and the return spring 66 are covered with a heat insulation cover 68.

In the exhaust system heat exchanger 15 having the valve device 54 that has been described heretofore, in the event that the pressure of exhaust gases is low, the valve 58 closes the exhaust gas guide pipe 42, that is, the bypass flow path 40 by virtue of the biasing force of the return spring 66, so that exhaust gases are allowed to flow through the exhaust gas flow path 34 of the heat exchange portion 15A. On the other hand, when the pressure of exhaust gases reaches or exceeds a predetermined value, the valve 58 is designed to take an open position according to the pressure of exhaust gases against the biasing force of the return spring 66. In this embodiment, the valve 58 is set to take an open position (refer to the imaginary lines in FIG. 9), in which the opening of the valve by virtue of the pressure of exhaust gases becomes maximum, by virtue of the pressure of exhaust gases at which a maximum output of the engine 20 is generated.

In addition, in this embodiment, the valve device 54 is made to force the valve 58 to be held in the open position irrespective of the pressure of exhaust gases in the event that the temperature of engine cooling water which exchanges heat with exhaust gases reaches or exceeds a predetermined temperature. Specifically, as is shown in FIG. 8, a first cooling water inlet pipe 70, which communicates with the engine cooling water flow path 38 in an interior thereof, is connected to a downstream side of the outer pipe 36 in the exhaust gas flow direction. A thermoactuator 72, whose operation end is provided inside the heat insulation cover 68, is provided at an end portion of the first cooling water inlet pipe 70. The thermoactuator 72 is configured to rotate the rotational shaft 56 against the biasing force of the return spring 66 by virtue of thermal expansion of wax filled in the interior thereof. In this embodiment, the thermoactuator 72 is made to cause, via the rotational shaft 56, the valve 58 to take a full open position whose opening is larger than that of the open position realized by virtue of the pressure of exhaust gases (to cause the valve 58 to maintain the full open position) in the event that the engine cooling water temperature is equal to or higher than 80° C. As is indicated by long-dashed short-dashed lines in FIG. 9, the full open position is a position resulting when the valve 58 rotates about 90° in the direction indicated by the arrow A from the closed position.

Figure 8:
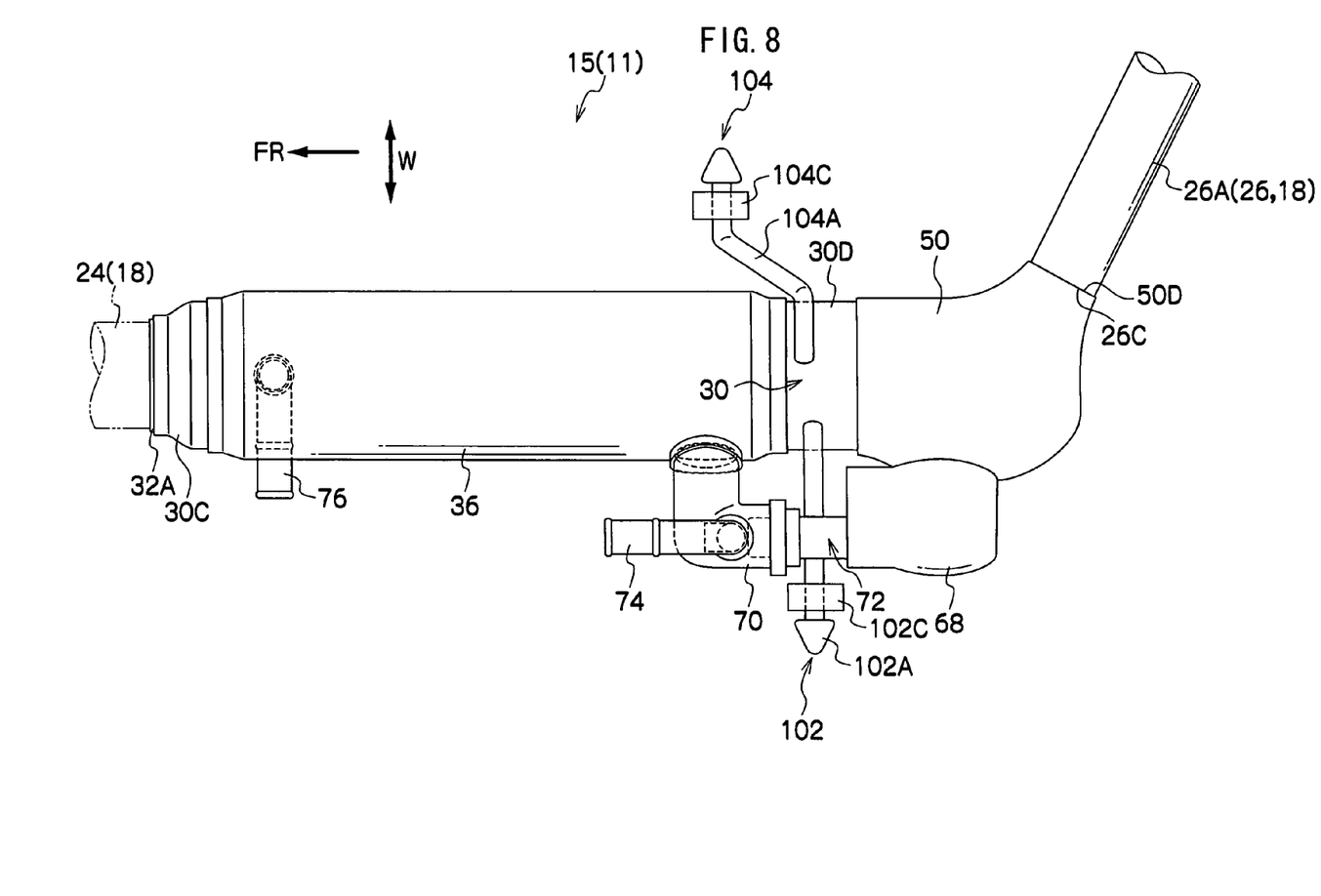
FIG. 8 is a plan view of an exhaust system heat exchanger which makes up the exhaust system mounting configuration according to the embodiment of the present invention.

As is shown in FIG. 8, a second cooling water inlet pipe 74 is connected to an intermediate portion of the first cooling water inlet pipe 70 for introducing engine cooling water into the engine cooling water flow path 38 of the exhaust system heat exchanger 15 by way of the first cooling water inlet pipe 70. On the other hand, a cooling water outlet pipe 76 is connected to an upstream side of the outer pipe 36 in the exhaust gas flow direction for discharging engine cooling water from the engine cooling water flow path 38. The cooling water outlet pipe 76 communicates with a substantially vertical apex portion (a highest portion) of the outer pipe 36, while the second cooling water inlet pipe 74 communicates with a portion which constitutes a highest portion of the first cooling water inlet pipe 70 which communicates with the outer pipe 36 in a position which is slightly lower than a vertical apex portion thereof and a portion which is higher than the highest portion of the outer pipe 36. The second cooling water inlet pipe 74 and the cooling water outlet pipe 76 are connected to a cooling water circulation path which includes the engine 20, a radiator and a heater core in such a manner as to become in series with the engine 20 at least along the flow of engine cooling water.

Thus, the exhaust system heat exchanger 15 is made to be a counter flow heat exchanger in which the flow of exhaust gases is opposite to the flow of engine cooling water, and in this embodiment, due to a spiral flow of exhaust gases along the spiral groove 30A being produced and a spiral flow of engine cooling water along the spiral groove 30B which is opposite to the flow of exhaust gases being produced, the exhaust system heat exchanger 15 is configured into an exhaust system heat exchanger which is compact in size and which provides a high heat exchange efficiency. In addition, in the exhaust system heat exchanger 15, the pressure loss (back pressure) in exhaust gases due to the passage through the bypass flow path 40 is sufficiently small relative to the pressure loss in exhaust gases due to the passage through the exhaust gas flow path 34, and exhaust gases are made to flow mainly through the bypass flow path 40 when the valve 58 takes the open position.

(Vehicle Body Structure)

Figure 2:
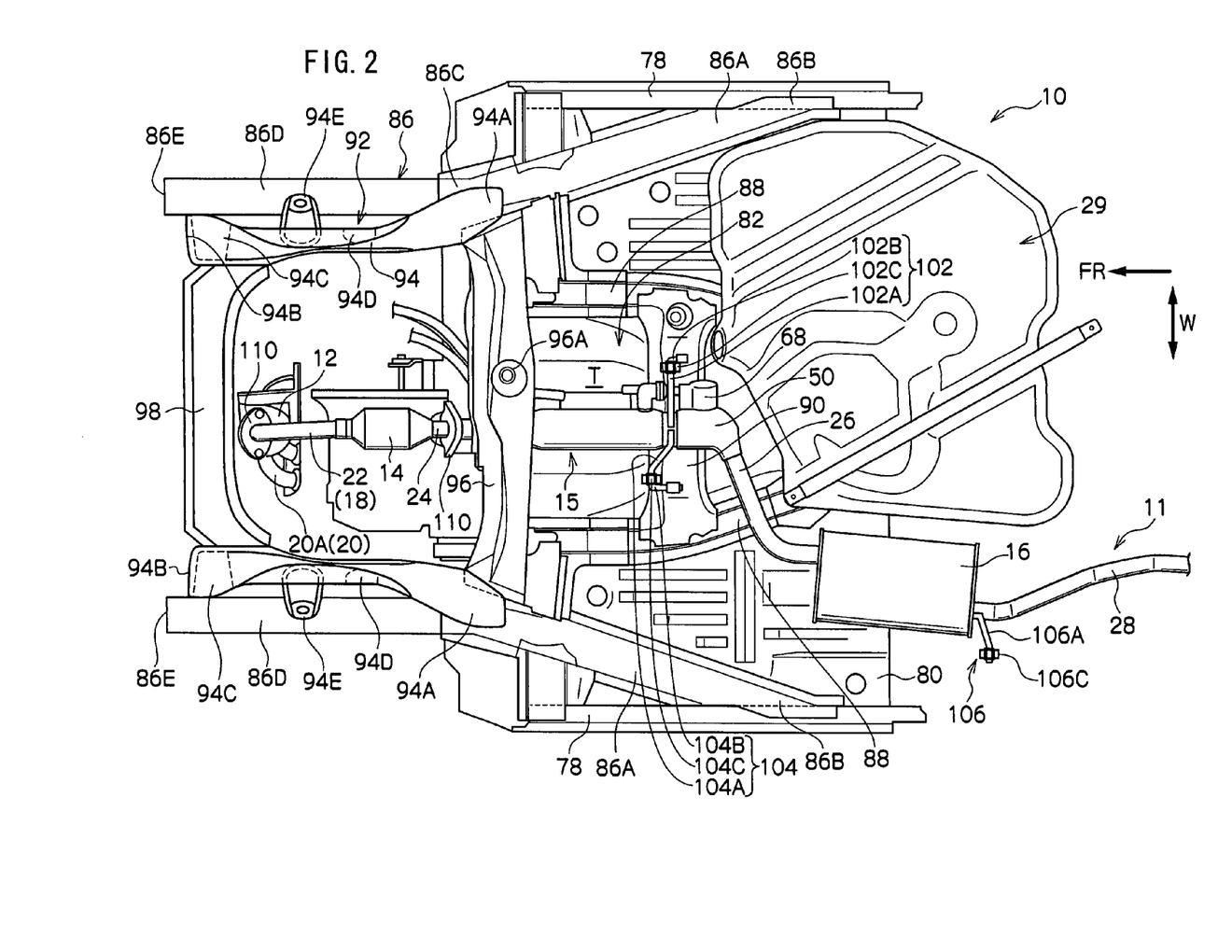
FIG. 2 is a bottom view which shows the exhaust system mounting configuration according to the embodiment of the present invention.
Figure 3:
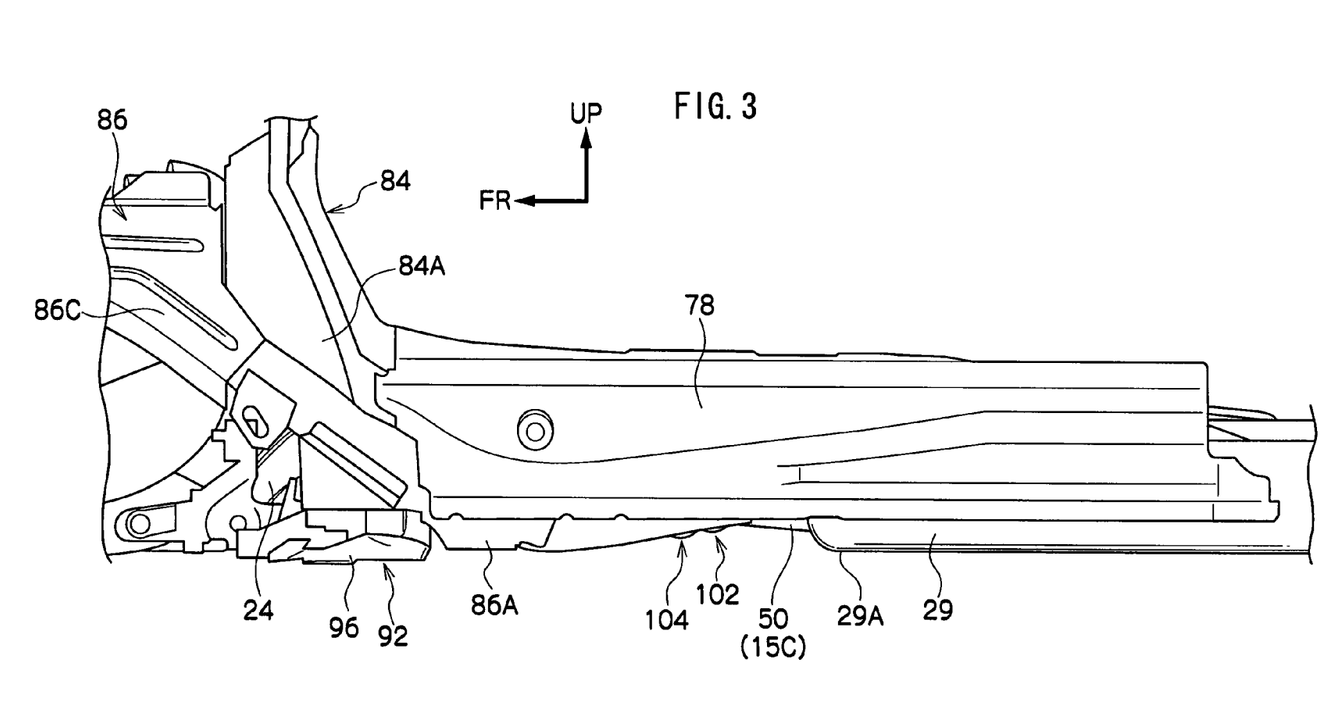
FIG. 3 is a side view which shows the exhaust system mounting configuration according to the embodiment of the present invention.

A lower structure of the vehicle body B is shown in bottom view in FIG. 2, and the lower structure of the vehicle body B is shown in side view in FIG. 3. As shown in these figures, the vehicle body B includes a pair of left and right rockers 78 which are each extended in the vehicle front-rear direction. The left and right rockers 78 make up outer ends in the vehicle width direction of a body framework. Different end portions in the vehicle width direction of a front floor panel 80 are joined to the left and right rockers 78, respectively. A floor tunnel 82 as a tunnel portion made to open downwards in the vehicle vertical direction is formed in a central portion in the vehicle width direction of the front floor panel 80. The floor tunnel 82 is also made to open forwards in the vehicle front-rear direction and is, as is shown in FIG. 3, made to continue to a tunnel portion 84A which is formed in a dash panel 84 which is joined to a front end 80A of the front floor panel 80. The dash panel 84 separates an engine room E from a vehicle cabin C in the vehicle front-rear direction.

In addition, rear portions 86A of front side members 86, which make up a framework in a front portion of the vehicle body, are joined to a lower surface of the front floor panel 80 in locations which lie between the floor tunnel 82 and the left and right rockers 78. The rear portions 86A of the front side members 86 are formed into a hat shape in cross section which is made to open upwards and forms a closed cross section by being joined to the front floor panel 80. The rear portions 86A of the front side members 86 are inclined (curved) in such a way that the rear ends 86B sides are positioned further outwards in the vehicle width direction relative to the vehicle front-rear direction and are joined (connected) to the left or right rockers 78. The left and right front side members 86 have kick portions 86C which continue to the front side of their corresponding rear portions 86A and which are joined to a lower surface of the dash panel 84. Front portions 86E, which each form a closed cross section independently, continue to front ends 86D of the kick portions 86C, respectively. Front ends of the front portions 86E are bridged by a front bumper reinforcement, not shown, which makes up a front bumper.

Furthermore, as is shown in FIG. 2, tunnel side reinforcements 88, which are each extended in the vehicle front-rear direction, are provided, respectively, in the vicinities of both outer sides in the vehicle width direction of the opening end 82A of the floor tunnel 82 on the front floor panel 80. Each of the tunnel side reinforcements 88 is formed into a hat shape in cross section which is made to open upwards and forms a closed cross section by being joined to the lower surface of the front floor panel 80. As is shown in FIG. 2, the left and right tunnel side reinforcements 88 are bridged by a body cross member 90 which is a cross member extended in the vehicle width direction.

Figure 1:
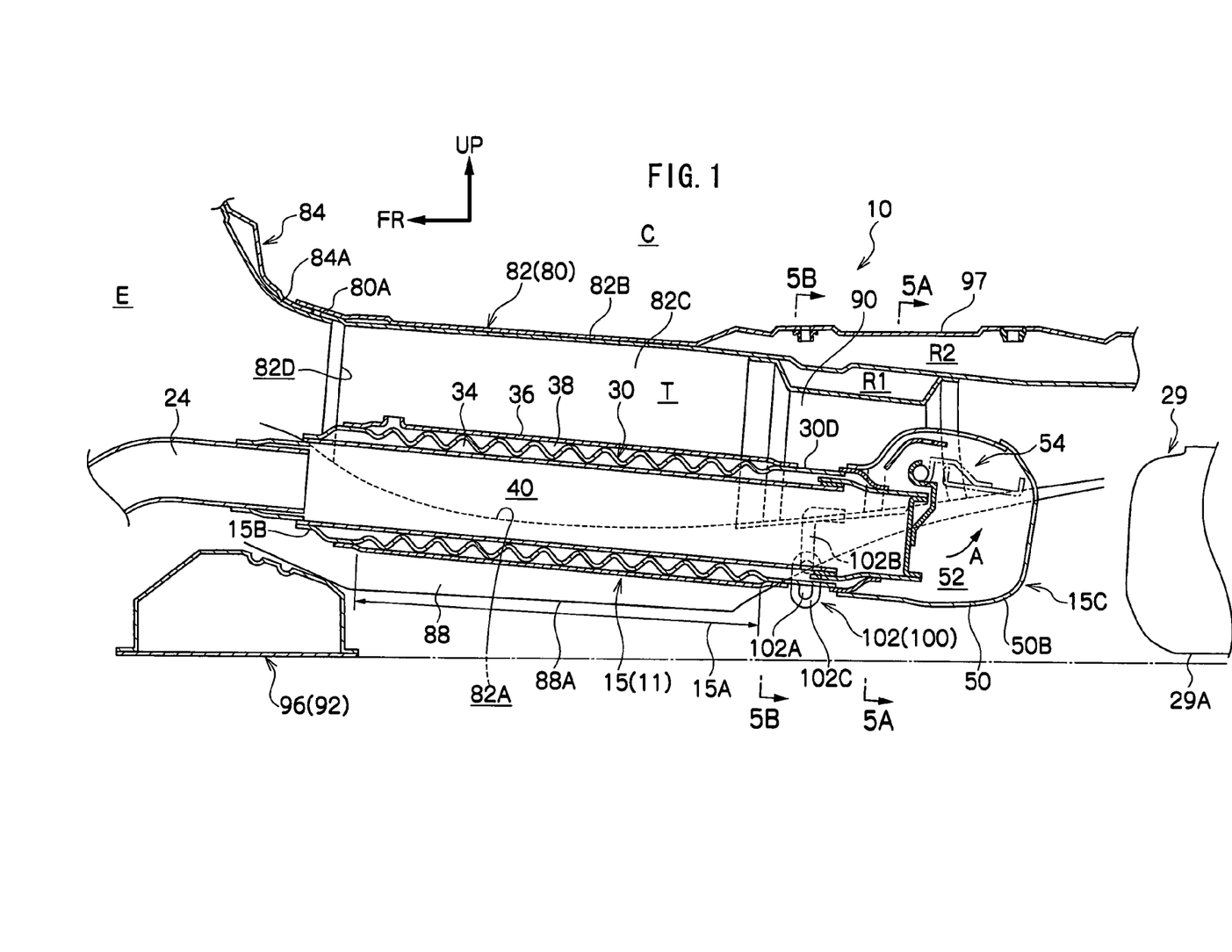
FIG. 1 is a cross-sectional side view which shows a main part of an exhaust system mounting configuration according to an embodiment of the present invention.
Figure 5A:
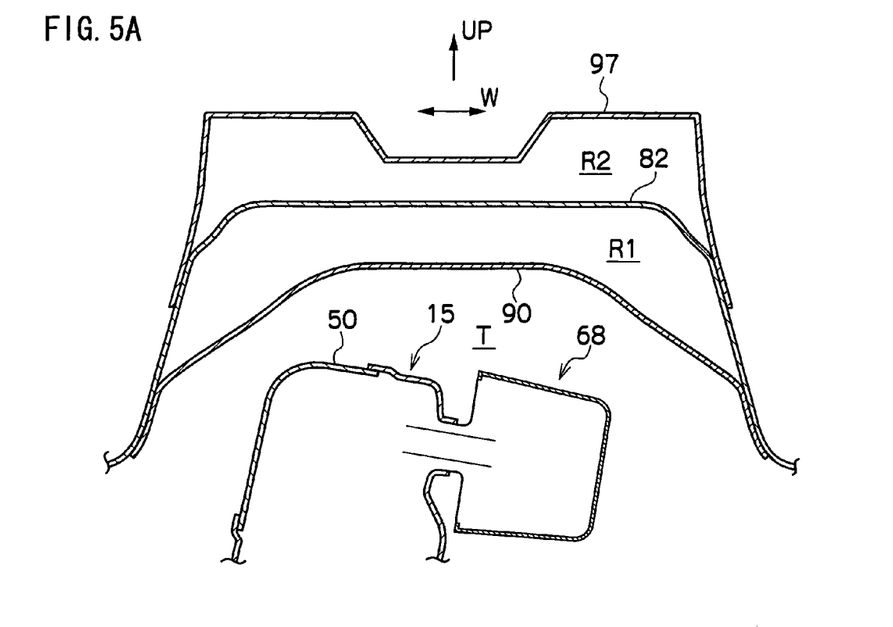
FIG. 5A is a cross-sectional view taken along the line 5A-5A in FIG. 1.
Figure 5B:
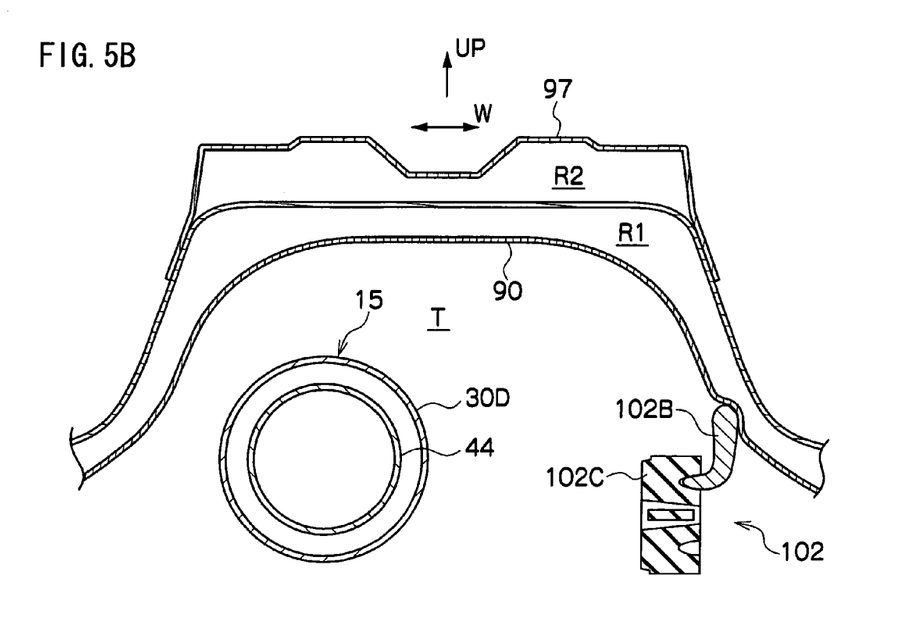
FIG. 5B is a cross-sectional view taken along the line 5B-5B in FIG. 1.

As is shown in FIG. 1, the body cross member 90 has a substantially hat shaped cross section which is made to open upwards in the vehicle vertical direction, while as is shown in FIGS. 5A and 5B, it is formed, as a whole, into a hat shape which is made to open downwards in the vehicle vertical direction when seen in plan view. As is shown in FIG. 2, the both ends in the vehicle width direction of the body cross member 90 are respectively joined to the tunnel side reinforcements 88 and the intermediate portion in the vehicle width direction of the body cross member 90 is joined at its substantially full length to an upper wall 82B and the inner surfaces of a wall portion 82C which face each other in the vehicle width direction. Accordingly, the body cross member 90 can also be regarded as a tunnel reinforcement.

In addition, as is shown in FIG. 2, the vehicle body B includes a subframe (a suspension member) 92 which is disposed at the front of the front floor panel 80. The subframe 92 is formed substantially into a rectangular frame shape when seen in plan view by a pair of left and right side rails 94 which are both extended in the vehicle front-rear direction and are fixed at rear ends 94 thereof to the kick portions 86C of the front side members 86 which lie on the same side relative to the center in the vehicle width direction, an engine rear mount support member (a rear cross member) 96 which is extended in the vehicle width direction and which bridges the rear ends 94A of the pair of left and right side rails 94 and a front cross member 98 which is extended in the vehicle width direction and which bridges front ends 94B of the pair of left and right side rails 94.

In this embodiment, the subframe 92 is configured such that the engine 20, which discharges exhaust gases, front suspension systems which support left and right front wheels and the like are mounted thereon. Specifically, a rear mount support portion 96A to which an engine rear mount, not shown, which is adapted to support a rear portion of the internal combustion engine, is fixed is provided on the engine rear mount support member 96. In addition, pairs of front and rear lower arm support portions 94C, 94D which support lower arms which make up the front suspension systems are formed on the pair of left and right side rails 94, respectively. Furthermore, side member connecting portions 94E which are connected, respectively, to the front portions 86E of the front side members 86 are provided between the lower arm support portions 94C, 94D of the pair of left and right side rails 94.

As is shown in FIG. 1, the engine rear mount support member 96 of the subframe 92, which has been described heretofore, is positioned at the lower side in the vehicle vertical direction relative to the left and right tunnel side reinforcements 88 which project further downwards than the downwardly oriented opening end 82A of the floor tunnel 82.

In addition, as is shown in FIG. 1, on the vehicle body B, a bracket 97 covers a rear portion of the floor tunnel 82 from above. The bracket 97 is adapted to support, for example, a shift lever device, not shown, or the like and is joined to the wall portion 82C of the floor tunnel 82 in such a state that the bracket 97 is spaced apart from the upper wall 82B thereof, so that as is shown in FIGS. 5A and 5B, a space is formed above the upper wall 82B, whereby a space R1 of a closed cross section which is defined by the body cross member 90 and the floor tunnel 82 and a space R2 which is defined by the bracket 97 and the floor tunnel 82 are interposed between a space T defined in the tunnel and the vehicle cabin C.

(Mounting Configuration of Exhaust System Heat Exchanger)

As is shown in FIG. 1, in the vehicle exhaust system mounting configuration 10, the catalytic converters 12, 14 of the exhaust system 11 which are connected to the internal combustion engine are disposed within the engine room E, and the catalytic converter to heat exchanger exhaust pipe 24 passes through the front oriented opening end 82D of the floor tunnel 82 to reach the interior of the floor tunnel 82. In addition, the exhaust system heat exchanger 15, which is extended in the vehicle front-rear direction as has been described above, is partially installed within the floor tunnel 82.

As is shown in FIG. 1, this exhaust system heat exchanger 15 is disposed slightly inclined relative to the vehicle front-rear direction (a horizontal plane) in such a manner that a front end portion 15B side in the vehicle front-rear direction is positioned further upwards in the vehicle vertical direction than a rear end portion 15C (the heat exchanger rear portion shell 50) side, i.e., in a manner that the front end portion 15B is spaced apart from a road surface R, and mainly an upper portion thereof is placed inside the floor tunnel 82. In addition, the front end portion 15B of the exhaust system heat exchanger 15 is positioned at the upper side in the vehicle vertical direction relative to the engine rear mount support member 96 which functions as the vehicle body framework, whereas the rear end portion 15C is positioned at the lower side in the vehicle vertical direction relative to the body cross member 90 which functions as the cross member.

Specifically, the rear end portion 15C of the exhaust system heat exchanger 15 at a portion directly rearwards of the exhaust system heat exchanger 15 in the longitudinal direction which lies out of a range where the heat exchange portion 15A is formed is positioned further downwards in the vehicle vertical direction than the body cross member 90 (inside the body cross member 90 which is formed into the shape which follows an inner surface of the floor tunnel 82 which is made to open downwards when seen in front view). In this embodiment, an exposed portion (an outer pipe 36) of the exhaust gas exhaust portion 30D of the partition wall pipe 30, a portion which is not covered by the heat exchanger rear portion shell 50 and part of the heat exchanger rear portion shell 50 which lies in the upstream side opening end 50A side of the heat exchanger rear portion shell 50 are positioned at the lower side of the body cross member 90.

In addition, in the vehicle exhaust system mounting configuration 10, the muffler 16 which makes up the exhaust system 11 is positioned further outwards in the vehicle width direction than one of the tunnel side reinforcements 88, and when seen in bottom view, the heat exchanger to muffler exhaust pipe 26 extends across the tunnel side reinforcements 88.

In addition, as is shown in FIG. 6 and FIG. 7, in the vehicle exhaust system mounting configuration 10, the first catalytic converter 12 is coupled directly to the exhaust manifold 20A of the engine 20 as has been described above, and a rear part of the exhaust system 11 which includes the exhaust system heat exchanger 15 is supported on the vehicle body B by a suspension unit 100. In this embodiment, in the exhaust system 11, the exhaust system heat exchanger 15 is supported on the vehicle body B by two support portions 102, 104 which both function as suspending support unit, the muffler 16 is supported on the vehicle body B by a support portion 106, and the downstream side exhaust pipe 28 is supported on the vehicle body B by a support portion 108. Specific description will be given below.

As is shown in FIG. 8, supported rods 102A, 104A, which function as supported members which project in opposite directions to each other in such a manner as to be substantially at right angles to the longitudinal direction of the exhaust system heat exchanger 15 when seen in plan view, are fixed to the exhaust gas exhaust portion 30D which is an exposed portion to the outside of the partition wall pipe 30 which makes up the exhaust system heat exchanger 15. As is shown in FIG. 9, the exhaust gas exhaust portion 30D of the partition wall pipe 30 is made to constitute a single-sheeted portion which is exposed between the outer pipe 36 in an outer shell of the exhaust system heat exchanger 15 and the end pipe 44.

As is shown in FIG. 2 and FIG. 6, the support portion 102 suspends (supports in a suspending fashion) the exhaust system heat exchanger 15, which constitutes the component of largest mass in the exhaust system 11, from the vehicle body B by causing a distal end portion of the supported rod 102A to be inserted into a support rubber 102C into which a support rod 102B fixed to the vehicle body B is inserted in such a manner as to enable a longitudinal relative displacement (absorption of thermal elongation). Similarly, the support portion 104 suspends the exhaust system heat exchanger 15 from the vehicle body B by causing a distal end portion of the supported rod 104A to be inserted into a support rubber 104C into which a support rod 104B fixed to the vehicle body B is inserted in such a manner as to enable a longitudinal relative displacement. In this embodiment, as is shown in FIG. 2, the support rods 102B, 104B are fixed to the body cross member 90.

The support portion 106 has a supported rod 106A which is fixed to a rear end 16D of a muffler shell 16C which makes up the muffler 16 and which projects outwards in the vehicle width direction. The supported rod 106A suspends (supports in a suspending fashion) the muffler 16, which constitutes the component of relatively large mass in the exhaust system 11, from the vehicle body B by being inserted into a support rubber 106C into which a support rod 106B fixed to the vehicle body B is inserted in such a manner as to enable a longitudinal relative displacement (absorption of thermal elongation). In addition, as is shown in FIG. 6, the support portion 108 has a supported rod 108A which is fixed to a position on the downstream side exhaust pipe 28 which lies in the vicinity of the atmosphere release portion 18A and which projects outwards in the vehicle width direction. The supported rod 108A suspends (supports in a suspending fashion) the downstream side exhaust pipe 28, which makes up the exhaust pipe 18, from the vehicle body B by being inserted into a support rubber 108C into which a support rod 108B fixed to the vehicle body B is inserted in such a manner as to enable a longitudinal relative displacement (absorption of thermal elongation).

Although the illustration is omitted, a configuration is adopted in which the center of gravity of the exhaust system 11 is situated inside an imaginary quadrangle which is formed by the four support portions 102, 104, 106, 108 (the support rubbers 102C, 104C, 106C, 108C).

Figure 4:
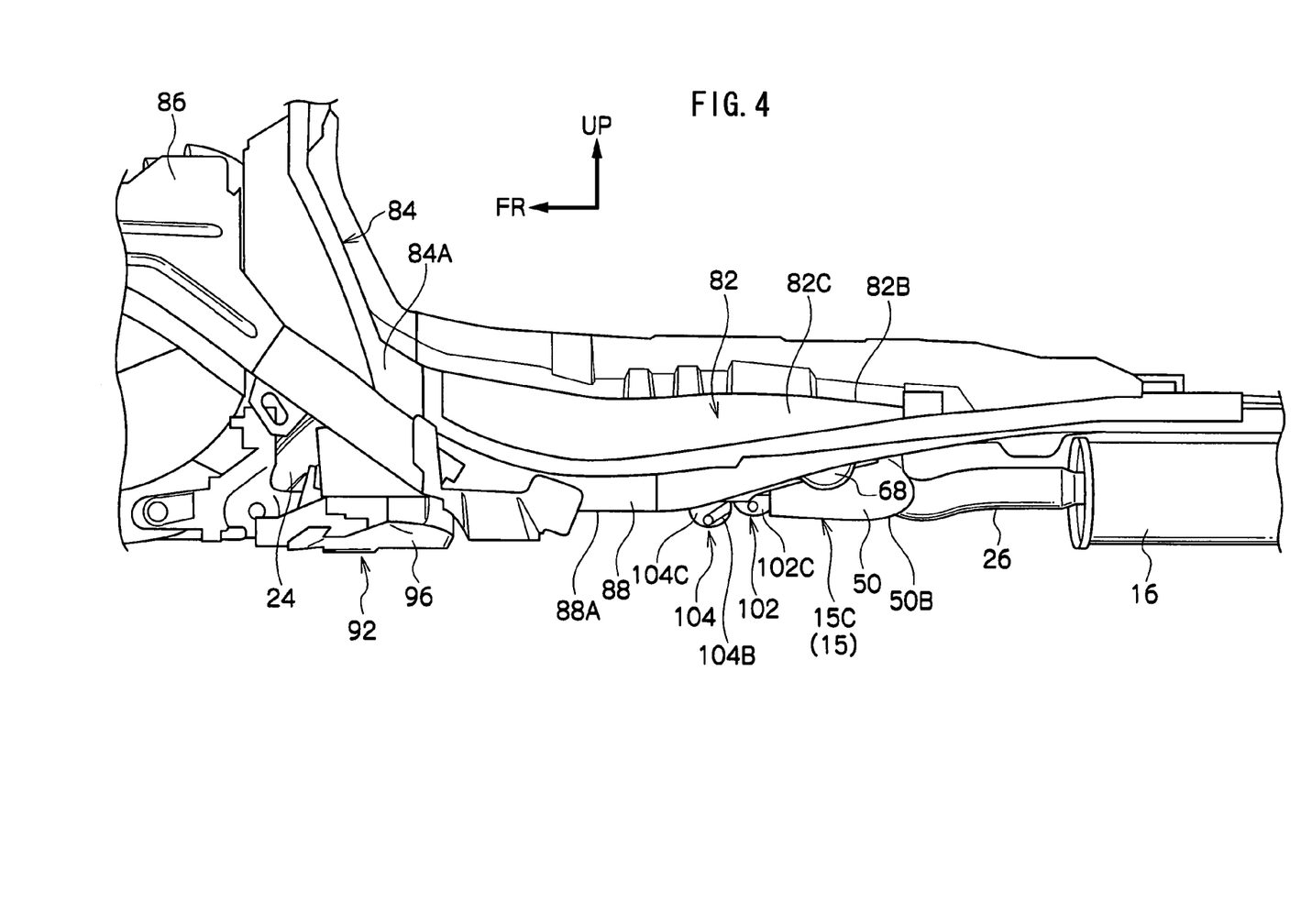
FIG. 4 is a side view which shows the exhaust system mounting configuration according to the embodiment of the present invention, with one of rockers removed.

As is shown in FIG. 4 which shows a state which results from removing the rocker 78 and the fuel tank 29 from FIGS. 1 and 3, in the exhaust system 11, which is supported on the vehicle body B by the suspension unit 100 as has been described above, a portion of the exhaust system heat exchanger 15 thereof which excludes the rear end portion 15C (a portion which covers substantially the full length of the heat exchange portion 15A) is positioned at the upper side in the vehicle vertical direction relative to lower edges 88A of the left and right tunnel side reinforcements 88. On the other hand, with respect to the rear end portion 15C of the exhaust system heat exchanger 15, mainly the exhaust gas exhaust portion 30D of the partition wall pipe 30 and a lower portion of the heat exchanger rear portion shell 50 project further downwards in the vehicle vertical direction than the lower edges 88A of the left and right tunnel side reinforcements 88.

In addition, in the vehicle exhaust system mounting configuration 10, as is shown in FIGS. 1 and 3, a lower portion 29A of the fuel tank 29 is positioned to project downwards in the vehicle vertical direction relative to a rear lower corner portion 50B of the heat exchanger rear portion shell 50 which makes up a lowermost portion in the vehicle vertical direction of the exhaust system heat exchanger 15. As is seen from the FIGS. 1 and 2, the lower portion 29A of the fuel tank 29 is positioned rearwards in the vehicle front-rear direction of the rear lower corner portion 50B of the heat exchanger rear portion shell 50 in such a manner as to be close thereto. The fuel tank 29 is formed as a resin fuel tank in which a tank main body for storing fuel therein is made of a resin material.

By this configuration, in the vehicle exhaust system mounting configuration 10, the engine rear mount support member 96, the fuel tank 29 and the left and right tunnel side reinforcements 88 are made to project downwards in the vehicle vertical direction relative to the exhaust system heat exchanger 15 forwards in the vehicle front-rear direction, rearwards in the vehicle front-rear direction and on both the sides of the exhaust system heat exchanger 15, respectively.

In addition, in the vehicle exhaust system mounting configuration 10 according to the embodiment, ball joints 110 are provided on the inter-catalytic converter exhaust pipe 22 and the catalytic converter to heat exchanger exhaust pipe 24 respectively, so as to suppress the transmission of vibration of the engine 20 to the exhaust system 11.

Next, the operation of the embodiment will be described.

In the exhaust system 11 to which the vehicle exhaust system mounting configuration 10 of the aforementioned configuration is applied, exhaust gases produced in association with the running of the engine 20 are purified, made silent, and released into the atmosphere via the first catalytic converter 12, the second catalytic converter 14, the exhaust system heat exchanger 15 and the muffler 16 which are made to communicate with each other through the exhaust pipe 18. In addition, in the exhaust system heat exchanger 15, if the temperature of engine cooling water is low, the valve 58 is made free relative to the thermoactuator 72, whereby the valve device 54 functions as a self-pressurizing valve. Because of this, under running conditions of low exhaust gas pressure, the exhaust gas guide pipe 42, that is, the bypass flow path 40, is closed by virtue of the biasing force of the return spring 66, and exhaust gases are made to flow through the exhaust gas flow path 34 in the heat exchange portion 15A, so as to implement a heat exchange with the engine cooling water which is flowing through the engine cooling water flow path 38. Thereby, warming up of the engine 20 can be promoted, and heating can be maintained, when starting a vehicle in low-temperature conditions.

For example, in a running condition in which the output of the engine 20 is increased for acceleration or climbing, when the pressure of exhaust gases is increased, the valve 58 which receives the pressure of the exhaust gases rotates in the direction indicated by the arrow A against the biasing force of the return spring 66 to reach the open position, whereby exhaust gases flow mainly through the bypass flow path 40, and the back pressure is reduced compared with the case in which exhaust gases flow through the exhaust gas flow path 34. Namely, in the vehicle exhaust system mounting configuration 10 which includes the valve device 54 which functions as the self-pressurizing valve, when the reduction in back pressure to secure the output of the engine 20 takes priority over the recovery of exhaust heat to warm up or the like the engine 20, exhaust gases bypass the heat exchange portion 15A to flow through the bypass flow path 40, whereby the back pressure is reduced automatically. In addition, when the engine 20 produces its maximum output, the valve 58 is caused to take the open position which is indicated by the imaginary lines in FIG. 9 by the pressure of exhaust gases (is opened to its maximum opening by the pressure of exhaust gases).

In addition, in the vehicle exhaust system mounting configuration 10, when the temperature of engine cooling water reaches or exceeds 80° C., the thermoactuator 72 imparts a torque which can resist the biasing force of the return spring 66 to the rotational shaft 56, so as to hold the valve 58 in the full open position, whereby exhaust gases are caused to flow mainly through the bypass flow path 40 and are then discharged from the heat exchanger to muffler exhaust pipe 26 by way of the exhaust gas guide pipe 42 and the exhaust gas exit header 52 of the heat exchanger rear portion shell 50. Namely, in the running condition in which the recovery of exhaust heat is not necessary, the exhaust gas flow path is automatically switched to the bypass flow path 40.

Here, in the vehicle exhaust system mounting configuration 10, since the exhaust system heat exchanger 15 is positioned at the lower side of the body cross member 90 and is supported on the body cross member 90 via the support portions 102, 104, the exhaust system heat exchanger 15, which makes up relatively large mass in the exhaust system 11, can be supported with the short support rods 102B, 104B. To complement this description, in the exhaust system heat exchanger unit 15, the supported rods 102A, 104A which are fixed by welding are preferably provided outside of the range where the engine cooling water flow path 38 is formed or outside of the range of the heat exchange portion 15A. Consequently, the support rods 102B, 104B can be made short at least in the vehicle front-rear direction by disposing the exhaust system heat exchanger 15 in such a manner that the exhaust gas exhaust portion 30D of the partition wall pipe 30 to which the supported rods 102A and 104A are fixed is positioned at the lower side of the body cross member 90.

In addition, in the configuration in which the exhaust system heat exchanger 15 is supported in a suspending fashion by fixing the support rods 102B, 104B to the vehicle body members which are situated at the lower side in the vehicle vertical direction relative to the exhaust system heat exchanger 15 such as the left and right tunnel side reinforcements 88, the support rods 102B, 104B are configured to be long by providing the rising portions on the support rods 102B, 104B, however, in the vehicle exhaust system mounting configuration 10, since mainly the exhaust gas exhaust portion 30D of the partition wall pipe 30 is disposed on the lower side of the body cross member 90, the vertical lengths of the support rods 102B, 104B can be made short, whereby the bending of the support rods 102B, 104B which support the exhaust system heat exchanger 15 is suppressed, thereby making it possible to support the exhaust system heat exchanger 15 properly.

In addition, in the vehicle exhaust system mounting configuration 10, as is shown in FIGS. 1, 5A and 5B, at least the space T defined within the tunnel and the space R2 are interposed as heat insulating layers between the portions on the exhaust system heat exchanger 15 which lie outside the heat exchange portion 15A which is likely to be heated to high temperatures, that is, the exhaust gas exhaust portion 30D of the partition wall pipe 30 and the heat exchanger rear portion shell 50, and the vehicle cabin C, so as to suppress the heat supply (heat transfer, radiation and combination thereof) from the exhaust system heat exchanger 15 to the vehicle cabin C. In particular, the heat supply from the exhaust system heat exchanger 15 to the vehicle cabin C is suppressed more effectively in the portion where the space R1 defined by the body cross member 90 is interposed as the heat insulating layer between the exhaust gas exhaust portion 30D and the heat exchanger rear portion shell 50 of the exhaust system heat exchanger 15, and the vehicle cabin C, whereby in the vehicle body B to which the vehicle exhaust system mounting configuration 10 is applied, the heat insulation measure for heat supplied from the exhaust system heat exchanger 15 to the vehicle cabin C can be simplified or the necessity thereof can be obviated.

Furthermore, in the vehicle exhaust system mounting configuration 10, since the engine rear mount support member 96, the fuel tank 29 and the left and right tunnel side reinforcements 88 are made to project downwards in the vehicle vertical direction relative to the exhaust system heat exchanger 15 forwards, rearwards and on both the sides in the vehicle width direction of the exhaust system heat exchanger 15, respectively, the exhaust system heat exchanger 15 is protected against interference with the road surface. In particular, in the vehicle exhaust system mounting configuration 10, the outer pipe 36 which makes up the engine cooling water flow path 38 through which engine cooling water flows in the exhaust system heat exchanger 15 is protected effectively by the left and right tunnel side reinforcements 88 and the engine rear mount support member 96.

Moreover, since the lower portion 29A of the fuel tank 29 is situated closely rearwards of the rear lower corner portion 50B of the heat exchanger rear portion shell 50 which constitutes the lowermost portion of the exhaust system heat exchanger 15, in the configuration in which the lowermost portion of the exhaust system heat exchanger 15 projects further downwards than the left and right tunnel side reinforcements 88, the exhaust system heat exchanger 15 can be protected effectively from the interference with the road surface. In particular, since the fuel tank 29 is the resin fuel tank which strongly resists impact, even in the event that the fuel tank 29 is deformed due to the interference with the road surface, the restoration of the fuel tank 29 is facilitated, and the maintenance of the protection structure (function) of the exhaust system heat exchanger 15 is facilitated by virtue of the restoration.

In addition, in the embodiment, while the vehicle exhaust system mounting configuration 10 has been described as being configured such that the exhaust gas exhaust portion 30D, which lies outside of the range where the heat exchange portion 15A is placed in the exhaust system heat exchanger 15, is disposed at the lower side of the body cross member 90 so as to make the support portions 102, 104 compact, the spaces R1, R2 are interposed between the exhaust gas exhaust portion 30D and the heat exchanger rear portion shell 50, which lie outside of the range where the heat exchange portion 15A is placed in the exhaust system heat exchanger 15, and the vehicle cabin C, and the interference of the rear lower corner portion 50B of the heat exchanger rear portion shell 50 with the road surface is prevented by the fuel tank 29, the invention is not limited to the aforesaid configuration, and hence, the invention may be configured such that at least one of the three functions is fulfilled.

In addition, in the embodiment, while the exhaust system heat exchanger 15 has been described as being inclined (rearwards) relative to the vehicle front-rear direction, the invention is not limited thereto, and hence, the exhaust system heat exchanger 15 may be disposed horizontally or in such a manner as to be inclined forwards.

The present invention provides a vehicle body mounting configuration including an exhaust system heat exchanger for mounting properly an exhaust system heat exchanger on a vehicle body.

A first aspect of the present invention provides a vehicle body mounting configuration including an exhaust system heat exchanger, comprising: an exhaust system heat exchanger which is extended in a vehicle front-rear direction so as to allow heat exchange to take place between exhaust gas flowing through an exhaust gas flow path and a cooling medium flowing through a cooling medium flow path; a tunnel portion which opens downwards in a vehicle vertical direction and extends in a vehicle front-rear direction and in which at least part of the exhaust system heat exchanger is placed inside; a cross member which extends in a vehicle width direction and which bridges wall portions of the tunnel portion which face each other in a vehicle width direction at an upper side in a vehicle vertical direction relative to a portion of the exhaust system heat exchanger which lies outside, in a longitudinal direction, of a range where the cooling medium flow path is placed; and a suspending support unit which is fixed at one end to a portion of the exhaust system heat exchanger at a lower side in a vehicle vertical direction of the cross member, and is fixed at the other end to the cross member so as to support the exhaust system heat exchanger on the cross member in a suspending fashion.

According to the above-described aspect, at least part of the exhaust system heat exchanger is placed inside the tunnel portion, and the exhaust system heat exchanger or at least part of the mass thereof is supported in a suspending fashion on the cross member which bridges the wall portions which make up the tunnel portion via the suspending support unit. Here, since the cross member is situated at the upper side of the portion of the heat exchanger which lies outside the range where the cooling medium flow path is placed, in other words, since the cross member to which the other end portion of the suspending support unit is fixed is situated at the upper side of the portion to which the one end portion of the suspending support unit is fixed, the exhaust system heat exchanger can be supported in the suspending fashion on the vehicle body by the suspending support unit which is made compact at least in the vehicle front-rear direction.

According to the above-described aspect, the exhaust system heat exchanger can be mounted properly on the vehicle body.

In the above-described aspect, the cross member may form a closed cross-sectional structure at least part of a portion which is positioned at the upper side in the vehicle vertical direction relative to the exhaust system heat exchanger.

According to the above-described aspect, since the closed cross-sectional structure which is defined by at least the cross member (independently or together with other member(s)) is interposed between the portion of the exhaust system heat exchanger which lies outside the range where the cooling medium flow path is placed, that is, the portion of the exhaust system heat exchanger which is likely to be heated to high temperatures, and the vehicle cabin, the supply of heat (heat transfer, radiation) from the exhaust system heat exchanger to the vehicle cabin is suppressed, whereby the necessity of a heat insulation structure for suppressing the supply of heat from the exhaust system heat exchanger to the vehicle cabin can be obviated or the heat insulation structure can be simplified.

A second aspect of the present invention provides a vehicle body mounting configuration including an exhaust system heat exchanger, comprising: an exhaust system heat exchanger which is extended in a vehicle front-rear direction so as to allow heat exchange to take place between exhaust gas flowing through an exhaust gas flow path and a cooling medium flowing through a cooling medium flow path; a tunnel portion which opens downwards in a vehicle vertical direction and extends in a vehicle front-rear direction and in which at least part of the exhaust system heat exchanger is placed inside; and a cross member which extends in a vehicle width direction and which bridges wall portions of the tunnel portion which face each other in a vehicle width direction and forms a closed cross-sectional structure at an upper side in a vehicle vertical direction relative to a portion of the exhaust system heat exchanger which lies outside, in a longitudinal direction, of a range where the cooling medium flow path is placed.

According to the above-described aspect, at least part of the exhaust system heat exchanger is placed inside the tunnel portion, and the cross member is disposed to overlap at the upper side in the vehicle vertical direction, that is, at the vehicle cabin side, of the portion of the exhaust system heat exchanger which lies outside of the range where the cooling medium flow path is placed, that is, the portion of the exhaust system heat exchanger which is likely to be heated to high temperatures. Since this cross member defines the closed cross-sectional structure independently or together with other member(s), the heat supply (heat transfer, radiation) from the exhaust system heat exchanger to the vehicle cabin is suppressed, whereby the necessity of a heat insulation structure for suppressing the supply of heat from the exhaust system heat exchanger to the vehicle cabin can be obviated or the heat insulation structure can be simplified.

According to the above-described aspect, the exhaust system heat exchanger can properly be mounted on the vehicle body.

In the above-described aspect, the exhaust system heat exchanger may be disposed in such a manner that a lowermost portion in the vehicle vertical direction is positioned at one end in a longitudinal direction, and the vehicle body mounting configuration may further comprise a fuel tank which is disposed closer to the one end than a central position in a longitudinal direction of the exhaust system heat exchanger and is positioned to project further downwards in the vehicle vertical direction than the lowermost portion in the vehicle vertical direction of the exhaust system heat exchanger.

According to the above-described aspect, since a lowermost portion of the fuel tank is positioned to project further downwards than the lowermost portion in the vehicle vertical direction of the exhaust heat exchanger, mainly the one end in the longitudinal direction (the cross member side) of the exhaust system heat exchanger is protected against the interference thereof with the road surface by the fuel tank. On the other hand, since the other end in the longitudinal direction of the exhaust system heat exchanger which is inclined in the vehicle front-rear direction is situated further upwards in the vehicle vertical direction than the lowermost portion lying at the one end, the other end of the exhaust system heat exchanger is easily protected by other vehicle body structures such as the tunnel portion than the fuel tank.

A third aspect of the present invention provides a vehicle body mounting configuration including an exhaust system heat exchanger, comprising: an exhaust system heat exchanger which is extended in a vehicle front-rear direction and is disposed in such a manner that a lowermost portion in a vehicle vertical direction is positioned at one end in a longitudinal direction; and a fuel tank which is disposed closer to the one end than a central position in a longitudinal direction of the exhaust system heat exchanger so that a lowermost portion in a vehicle vertical direction projects further downwards in a vehicle vertical direction than the one end of the exhaust system heat exchanger.

According to the above-described aspect, since the lowermost portion of the fuel tank is positioned to project further downwards than the lowermost portion in the vehicle vertical direction of the exhaust system heat exchanger, mainly the one end in the longitudinal direction of the exhaust system heat exchanger is protected by the fuel tank against the interference with the road surface.

According to the above-described aspect, the exhaust system heat exchanger can properly be mounted on the vehicle body.

In the above-described aspect, the fuel tank may be configured such that a tank main body which stores fuel therein comprises a resin material.

According to the above-described aspect, since the tank main body of the fuel tank is configured to comprise the resin material, the fuel tank is made to resist impact (the fuel tank restores its original shape even though it is deformed). Due to this, it is prevented that the fuel tank is deformed by the interference with the road surface whereby the position of the lowermost portion thereof is moved upwards in the vehicle vertical direction, and even in the event that the fuel tank is caused to interfere with the road surface, the maintenance of the protection structure (function) of the exhaust system heat exchanger is facilitated.

In the above-described aspect, the exhaust system heat exchanger may be disposed inclined relative to the vehicle front-rear direction in such a manner that the one end in the longitudinal direction is positioned further downwards in the vehicle vertical direction than the other end in the longitudinal direction, and the other end in the longitudinal direction may be disposed at the upper side of a vehicle body framework which extends in the vehicle width direction.

According to the above-described aspect, the one end of the exhaust system heat exchanger which is disposed inclined is protected by the fuel tank against the interference with the road surface, while the other end thereof is protected by the vehicle body framework against the interference with the road surface. Since the vehicle body framework is disposed in such a manner as to extend across directly below the exhaust system heat exchanger, the other end of the exhaust system heat exchanger can properly be protected.

As has been described heretofore, the vehicle body mounting configuration including an exhaust system heat exchanger according to an aspect of the present invention has a superior advantage that the exhaust system heat exchanger can properly be mounted on the vehicle body.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle body mounting configuration including an exhaust system heat exchanger, comprising:
    the exhaust system heat exchanger, which is extended in a vehicle front-rear direction so as to allow heat exchange to take place between exhaust gas flowing through an exhaust gas flow path and a cooling medium flowing through a cooling medium flow path;
    a tunnel portion which opens downward in a vehicle vertical direction and extends in the vehicle front-rear direction and in which at least part of the exhaust system heat exchanger is placed inside;
    a cross member which extends in a vehicle width direction and which bridges wall portions of the tunnel portion which face each other in the vehicle width direction at an upper side in the vehicle vertical direction relative to a portion of the exhaust system heat exchanger which lies outside, in a longitudinal direction, of a range where the cooling medium flow path is placed; and
    a suspending support unit which is fixed at one end to a portion of the exhaust system heat exchanger at a lower side in the vehicle vertical direction of the cross member, and is fixed at an other end to the cross member so as to support the exhaust system heat exchanger on the cross member in a suspending fashion, wherein
    the exhaust system heat exchanger is disposed in such a manner that a lowermost portion in the vehicle vertical direction is positioned at a first end in a longitudinal direction,
    the vehicle body mounting configuration further comprises a fuel tank which is disposed closer to the first end than to a central position in the longitudinal direction of the exhaust system heat exchanger and is positioned to project farther downward in the vehicle vertical direction than the lowermost portion of the exhaust system heat exchanger in the vehicle vertical direction,
    the exhaust system heat exchanger is disposed inclined relative to the vehicle front-rear direction in such a manner that the first end in the longitudinal direction is positioned farther downward in the vehicle vertical direction than a second end in the longitudinal direction, and
    the second end in the longitudinal direction is disposed at an upper side of a vehicle body framework which extends in the vehicle width direction.

2. The vehicle body mounting configuration including the exhaust system heat exchanger according to claim 1, wherein the cross member forms a closed cross-sectional structure at at least part of a portion which is positioned at the upper side in the vehicle vertical direction relative to the exhaust system heat exchanger.

3. The vehicle body mounting configuration including the exhaust system heat exchanger according to claim 2, wherein the fuel tank is configured such that a main body of the fuel tank which stores fuel therein comprises a resin material.

4. The vehicle body mounting configuration including the exhaust system heat exchanger according to claim 1, wherein the fuel tank is configured such that a main body of the fuel tank which stores fuel therein comprises a resin material.

5. A vehicle body mounting configuration including an exhaust system heat exchanger, comprising:
    the exhaust system heat exchanger, which is extended in a vehicle front-rear direction so as to allow heat exchange to take place between exhaust gas flowing through an exhaust gas flow path and a cooling medium flowing through a cooling medium flow path;
    a tunnel portion which opens downward in a vehicle vertical direction and extends in the vehicle front-rear direction and in which at least part of the exhaust system heat exchanger is placed inside; and
    a cross member which extends in a vehicle width direction and which bridges wall portions of the tunnel portion which face each other in the vehicle width direction and forms a closed cross-sectional structure at an upper side in the vehicle vertical direction relative to a portion of the exhaust system heat exchanger which lies outside, in a longitudinal direction, of a range where the cooling medium flow path is placed, wherein
    the exhaust system heat exchanger is disposed in such a manner that a lowermost portion in the vehicle vertical direction is positioned at a first end in a longitudinal direction,
    the vehicle body mounting configuration further comprises a fuel tank which is disposed closer to the first end than to a central position in the longitudinal direction of the exhaust system heat exchanger and is positioned to project farther downward in the vehicle vertical direction than the lowermost portion of the exhaust system heat exchanger in the vehicle vertical direction,
    the exhaust system heat exchanger is disposed inclined relative to the vehicle front-rear direction in such a manner than the first end in the longitudinal direction is positioned farther downward in the vehicle vertical direction than a second end in the longitudinal direction, and
    the second end in the longitudinal direction is disposed at an upper side of a vehicle body framework which extends in the vehicle width direction.

6. The vehicle body mounting configuration including the exhaust system heat exchanger according to claim 5, wherein the fuel tank is configured such that a main body of the fuel tank which stores fuel therein comprises a resin material.

* * * * *